(12) United States Patent
Johnson

(10) Patent No.: US 9,233,501 B2
(45) Date of Patent: Jan. 12, 2016

(54) APPARATUS FOR LINEAR FRICTION WELDING

(71) Applicant: APCI, LLC, South Bend, IN (US)

(72) Inventor: Stephen A. Johnson, South Bend, IN (US)

(73) Assignee: APCI, LLC, South Bend, IN (US)

( * ) Notice: Subject to any disclaimer, the term of this patent is extended or adjusted under 35 U.S.C. 154(b) by 0 days.

(21) Appl. No.: 14/359,282

(22) PCT Filed: Dec. 5, 2012

(86) PCT No.: PCT/US2012/067886
§ 371 (c)(1),
(2) Date: May 19, 2014

(87) PCT Pub. No.: WO2013/085962
PCT Pub. Date: Jun. 13, 2013

(65) Prior Publication Data
US 2014/0338841 A1 Nov. 20, 2014

Related U.S. Application Data

(60) Provisional application No. 61/630,128, filed on Dec. 5, 2011.

(51) Int. Cl.
*B32B 37/00* (2006.01)
*B29C 65/06* (2006.01)
*B23K 20/12* (2006.01)

(52) U.S. Cl.
CPC .............. *B29C 65/0618* (2013.01); *B23K 20/12* (2013.01); *B23K 20/1205* (2013.01)

(58) Field of Classification Search
CPC .... B23K 20/1205; B23K 20/12; B29C 65/06; B29C 65/0618
USPC .............. 156/73.5, 73.6, 308.2, 580; 228/2.1, 228/112.1
See application file for complete search history.

(56) References Cited

U.S. PATENT DOCUMENTS

| | | | |
|---|---|---|---|
| 4,858,815 A | 8/1989 | Roberts et al. | |
| 5,248,077 A | 9/1993 | Rhoades et al. | |
| 5,464,498 A * | 11/1995 | McGrath | 156/580.2 |
| 5,468,336 A * | 11/1995 | Lotz et al. | 156/580.2 |
| 8,181,841 B2 * | 5/2012 | Johnson et al. | 228/2.1 |
| 2006/0113358 A1 | 6/2006 | Crasser | |

* cited by examiner

*Primary Examiner* — James Sells
(74) *Attorney, Agent, or Firm* — Maginot, Moore & Beck, LLP

(57) ABSTRACT

The linear friction welding (LFW) apparatus of this invention, in various embodiments includes a vibrating assembly or assemblies, which simultaneously vibrates both work pieces along the weld axis during the weld process. In one embodiment, separate vibrating assemblies are used to vibrate each work piece along the weld axis relative to each other. Each vibrating assembly has its own oscillator mechanism with motors and cams that can be moved into and out of phase with that of the other vibrating mechanism to generate the relative movement between the work pieces. In another embodiment, the apparatus includes a vibrating assembly that uses a single oscillator and two sets of rocker arms supporting carriages operatively connected by a linkage mechanism to simultaneously vibrate both work pieces along the weld axis.

8 Claims, 6 Drawing Sheets

APPARATUS FOR LINEAR FRICTION WELDING

This application is a 35 U.S.C. 371 National Stage Application of PCT/US2012/067886, filed on Dec. 5, 2012, which claims the benefit of U.S. Provisional Patent Application Ser. No. 61/630,128 filed Dec. 5, 2011, the entirety of which is incorporated by reference herein.

This invention relates to an apparatus for linear friction welding, and in particular a linear friction welding apparatus having a vibrating assembly or assemblies, which simultaneously vibrate both work pieces along the weld axis during the weld process.

BACKGROUND AND SUMMARY OF THE INVENTION

Linear friction welding (LFW) is a process of joining two components which may be made from the same or different materials. The LFW process typically involves pressing the two components together under a large amount of force and rapidly vibrating the components with respect to one another to generate friction at the interface between the two components. The pressure and movement generate sufficient heat to cause the material at the interface to plasticize. Once the material at the interface begins to plasticize, the vibration is stopped and an increased force is applied. As the plasticized material of both components cools in this static condition, the components are bonded together and a weld is formed. While LFW is suitable in many applications, heretofore, LFW has not been practical for repair welds.

The linear friction welding (LFW) apparatus of this invention, in various embodiments includes a vibrating assembly or assemblies, which simultaneously vibrates both work pieces along the weld axis during the weld process. In one embodiment of this invention, separate vibrating assemblies are used to vibrate each work piece along the weld axis relative to each other. Each vibrating assembly has its own oscillator mechanism with motors and cams that can be moved into and out of phase with that of the other vibrating mechanism to generate the relative movement between the work pieces. In another embodiment of this invention, the apparatus includes a vibrating assembly that uses a single oscillator and two sets of rocker arms supporting carriages operatively connected by a linkage mechanism to simultaneously vibrate both work pieces along the weld axis. In each embodiment of the LFW apparatus of this invention, each vibrating assembly controls the amplitude and frequency of the oscillation during the weld process, but also almost instantly stop the oscillation with no load on the tooling or work piece. Furthermore, vibrating both work pieces relative to one another provides certain mechanical advantages over simply vibrating a single work piece against a fixed or stationary work piece.

The apparatus and method of the present invention may take form in various systems and components, as well as the arrangement of those systems and components. The above described features and advantages, as well as others, will become more readily apparent to those of ordinary skill in the art by reference to the following detailed description and accompanying drawings. The drawings are only for purposes of illustrating exemplary embodiments and are not to be construed as limiting the invention.

DESCRIPTION OF THE PREFERRED EMBODIMENT

Figure 1:
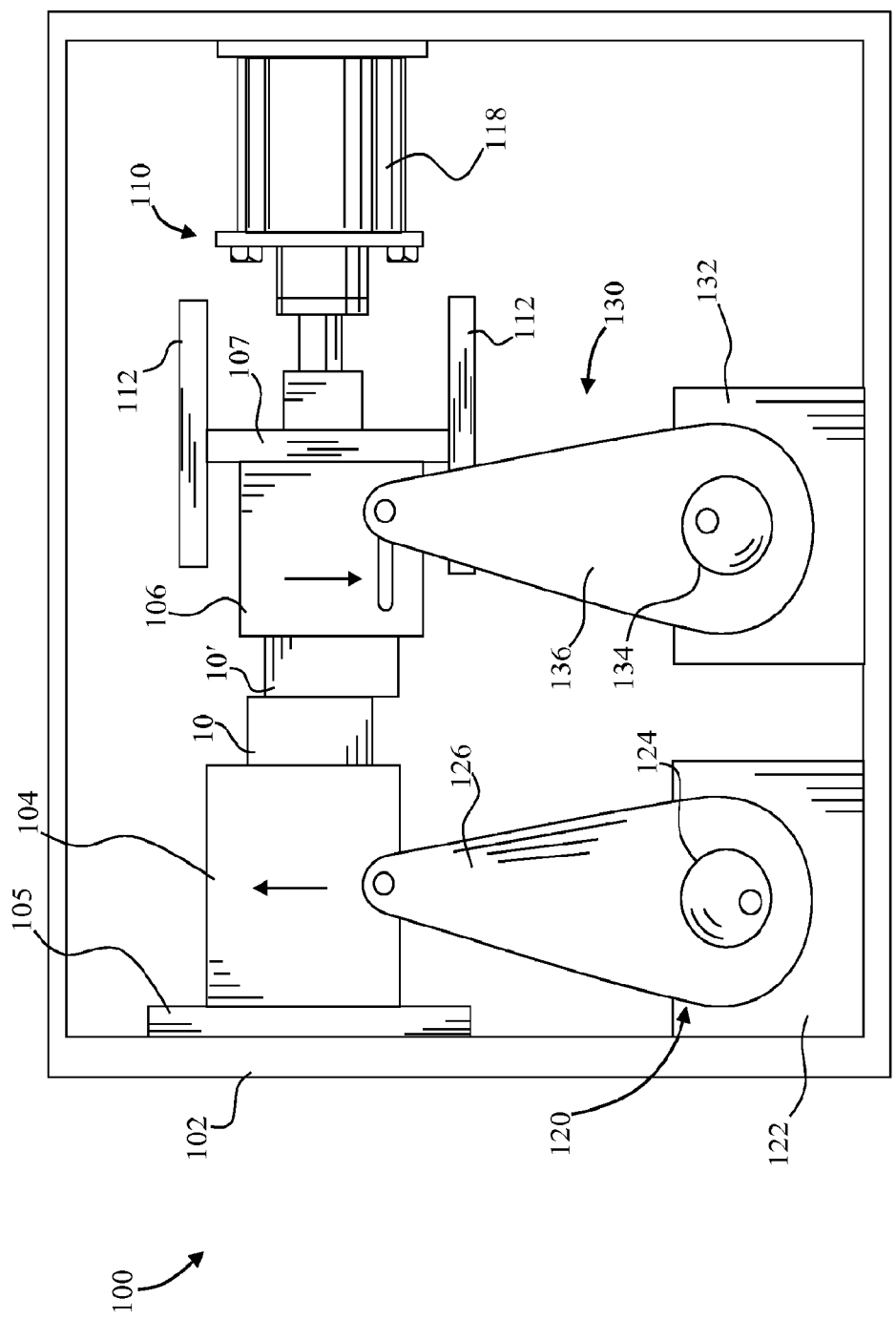
FIG. 1 is a simplified side view of an embodiment of the linear friction welding apparatus of this invention.

Referring now to the drawings, each embodiment of the linear friction welding (LFW) apparatus of this invention includes a vibrating assembly or assemblies, which vibrates both work pieces during the weld process. The vibrating assemblies of each embodiments of the LFW apparatus of this invention include an oscillation mechanism that embodies the teachings of the linear friction welding (LFW) apparatus developed by APCI, Inc. in South Bend, Ind. that are described in U.S. patent application Ser. No. 8,070,039 issued on Dec. 6, 2011. The oscillator mechanisms enable the LFW apparatus of this invention to control the amplitude, frequency and termination of the weld oscillation, as well as the weld and force pressures during the weld process. For simplicity of explanation herein, the particular components of the oscillation mechanisms, as well as their operation and advantage are not fully illustrated or described herein, but may be inferred by reference to the above identified U.S. patent applications and patents, which are incorporated herein. In certain embodiments, the oscillator mechanism may include a ram configured to vibrate along a welding axis, a cam follower operably connected to the ram, an eccentric including an eccentric outer periphery operably engaged with the cam follower, and an inner periphery, a first power shaft slidingly engaged with the eccentric, and a second power shaft eccentrically engaged with the inner periphery. In other embodiments, the oscillator mechanisms may include a ram configured to vibrate along a welding axis, a first power shaft operably connected to the ram and associated with a first eccentricity, a second power shaft operably connected to the ram and associated with a second eccentricity. The oscillator mechanisms are generally controlled electronically by program instructions, and an electronic controllers that control the phased relationship between the first eccentricity and the second eccentricity such that the ram does not vibrate along the welding axis, establish a first pressure between two components to be welded. The electronic controller also control the phased relationship such that the ram does not vibrate, and the phased relationship such that the ram vibrates along the welding axis after the first pressure has been established.

First Embodiment

FIG. 1 illustrates an embodiment of the linear friction welding (LFW) apparatus of this invention, which is designated as reference number 100. LFW apparatus 100 includes two mounting fixtures 104 and 106 that securely hold work pieces 10 and 10' during the weld process. Mounting fixtures 102 and 104 may take any suitable form or configuration depending on the size, shape and configuration of the work pieces being welding in any particular application. As shown, fixture 104 rides on slides 105 mounted to frame 102 to facilitate the transverse motion of work piece 10 along the weld axis. Similarly fixture 106 rides on slides 107 to facilitate the transverse motion of work piece 10' along the same weld axis. LFW apparatus 100 includes a press assembly 110 that forcibly moves fixture 106 toward fixture 102 to apply the weld and forging pressures to work pieces 10 and 10' during the welding process. As shown, press assembly 110 includes slides 112 which shiftably support fixture 106 and a hydraulic ram 118, which drives fixture 106 back and forth along slides 112. LFW apparatus 100 further includes two vibrating assemblies 120 and 130. Each vibrating assembly 120 and 130 follows the teachings of the above identified patent applications and patents, and includes drive motors 122 and 132, oscillators 124 and 134, and drive arms 126 and 128, respectively. Drive arm 126 is operatively connected to fixture 104 to vibrate work piece 10. Drive arm 136 is operatively connected to fixture 106 to vibrate work piece 10'.

In this embodiment of the apparatus of this invention, the motors/cams of each vibrating assembly are moved into and out of phase to generate the relative movement between the work pieces. When the motors/cams of vibrating assemblies 120 and 130 are in phase with respect to one another, the relative speed between work pieces 10 and 10' is zero. Bringing the motors/cams of vibrating assembly 120 and 130 out of phase with respect to one another creates relative movement (vibration) between work pieces 10 and 10' at a corresponding amplitude. Those skilled in the art will note that in accordance with the teachings of the above identified patent applications and patents, the use of two vibrating assemblies having two sets of oscillator mechanisms provides certain mechanical advantages. Bringing the motors/cams of vibrating assemblies 120 and 130 back into phase terminates the vibration. The use of two vibrating assemblies having separate sets of motors and cams, provides a fourfold mechanical advantage in amplitude and frequency over a single oscillator mechanism than simply vibrating one work piece against a stationary work piece.

Second Embodiment

Figure 2:
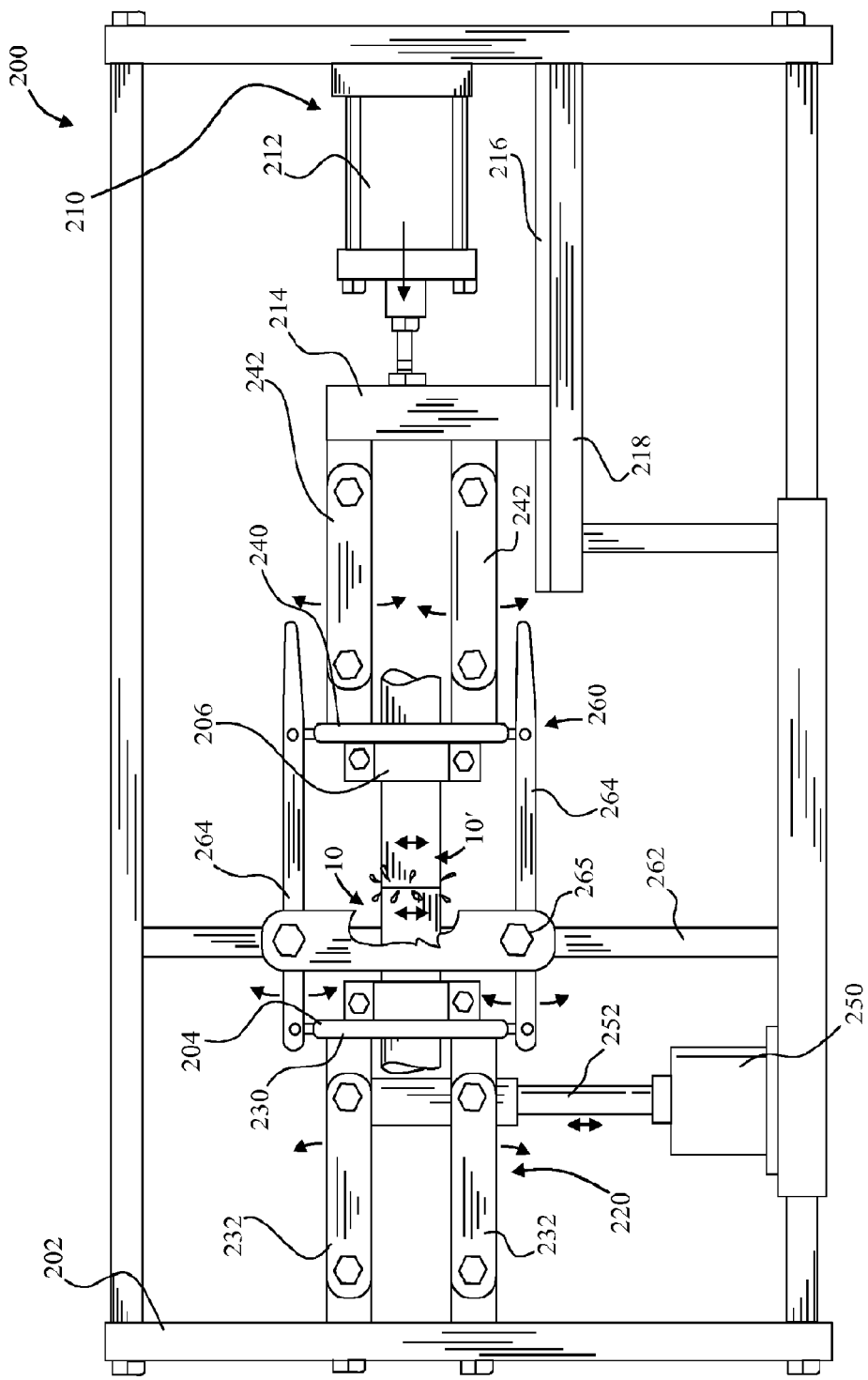
FIG. 2 is a simplified side view of a second embodiment of the linear friction welding apparatus of this invention.
Figure 3:
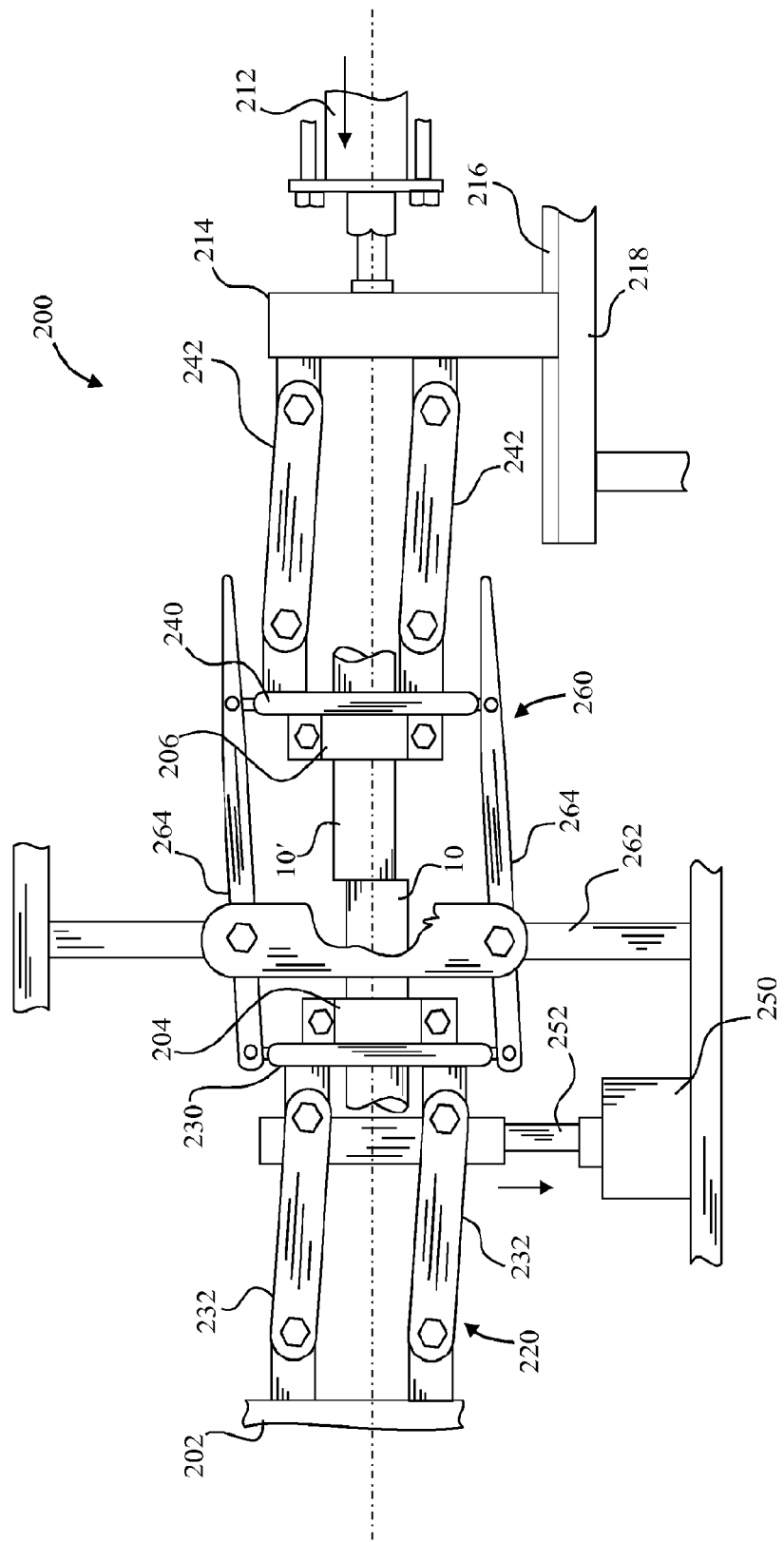
FIG. 3 is a partial side view of the linear friction welding apparatus of FIG. 2.

FIGS. 2 and 3 illustrate another embodiment of the linear friction welding LFW) apparatus, which is designated as reference number 200. LFW apparatus 200 uses a single oscillator and two sets of rocker arm supported carriages operatively connected by a linkage mechanism to simultaneously vibrate both work pieces 10 and 10' along a single weld axis. The dual sets of rocker arm supported carriages connected by the linkage mechanism generates the relative movement between the work pieces, which provides a mechanical advantage over a single oscillator vibrating assembly.

As shown, LFW apparatus 200 includes two mounting fixtures 204 and 206 that securely hold work pieces 10 and 10' during the weld process. As with the LFW apparatus 100, mounting fixtures 204 and 206 may take any suitable form or configuration depending on the size, shape and configuration of the work pieces being welded in any particular application. Fixtures 204 and 206 are operatively connected to vibrating assemblies 220. Vibrating assembly 220 again follows the teachings of the above identified patent applications and patents. Vibrating assembly 220 includes a pair of carriages 230 and 240, each shiftably supported by rocker arms 232 and 242, respectively. Rocker arms 232 are pivotally mounted to frame 202 and rocker arms 242 are pivotally mounted to a sliding platform 214, which forms part of a press assembly 110. Press assembly 110 also includes slides 218 upon which platform 214 rides and a hydraulic press 112, which provides the weld and forge pressures for the welding process. A ram 252 operatively connects oscillator 250 to carriage 230. Following the teachings of the above identified patent applications and patents, oscillator 250 is driven by various motors, linkages, gears and cam assemblies (not shown). Carriages 230 and 240 are operatively connected by a pair of linkage arms 264, which transfer the oscillating motion from oscillator 250 to simultaneous vibration in opposite directions to the carriages. As shown, a midpoint 265 of each linkage arm 264 is pivotally connected to an upright 262. Oscillation of ram 252 raises and lowers carriage 230 while simultaneously lowering and raising carriage 240 thereby providing the relative movement (vibration) between work pieces 10 and 10'.

Third Embodiment

Figure 4:
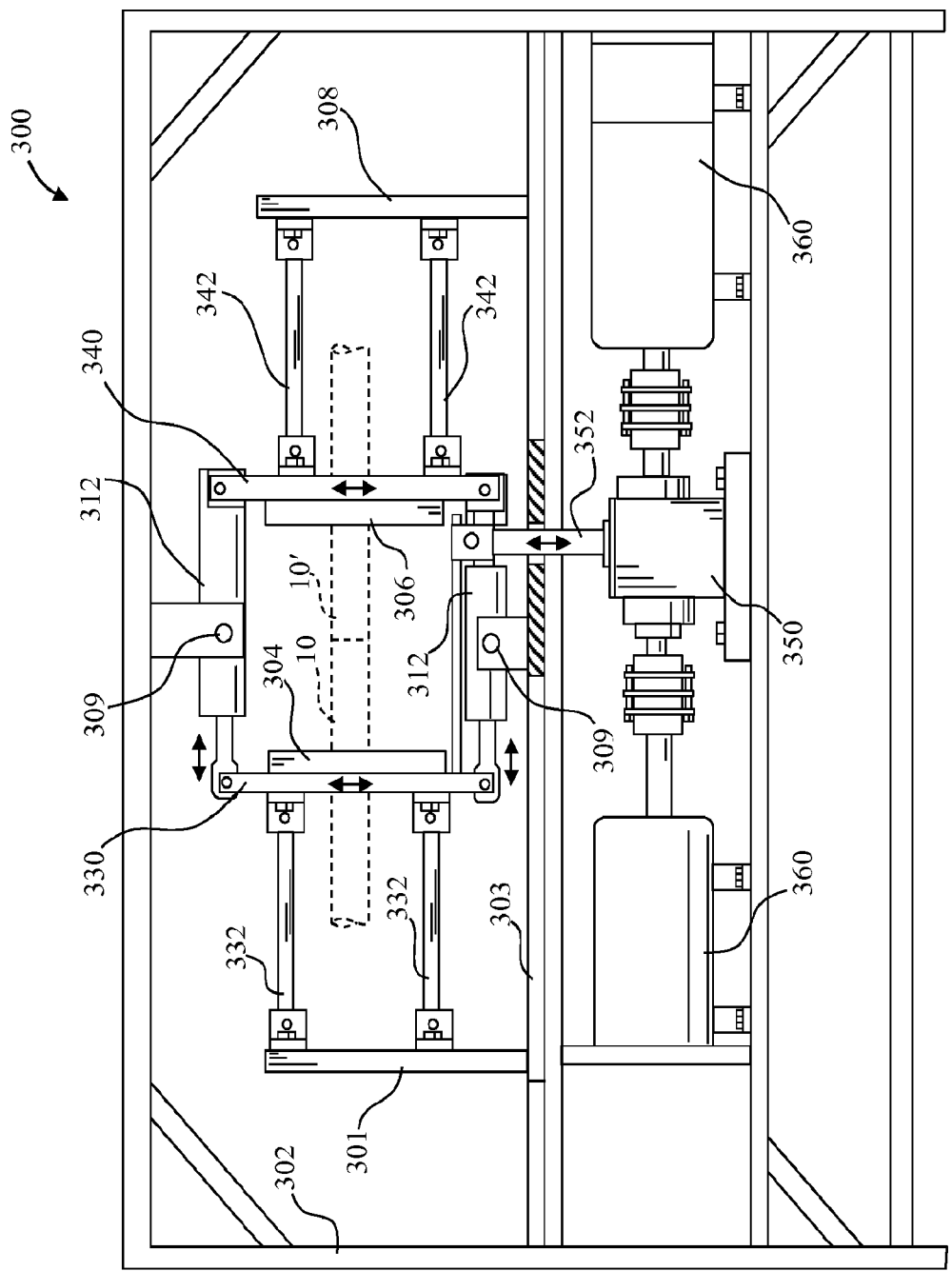
FIG. 4 is a simplified side view of a third embodiment of the linear friction welding apparatus of this invention.
Figure 5:
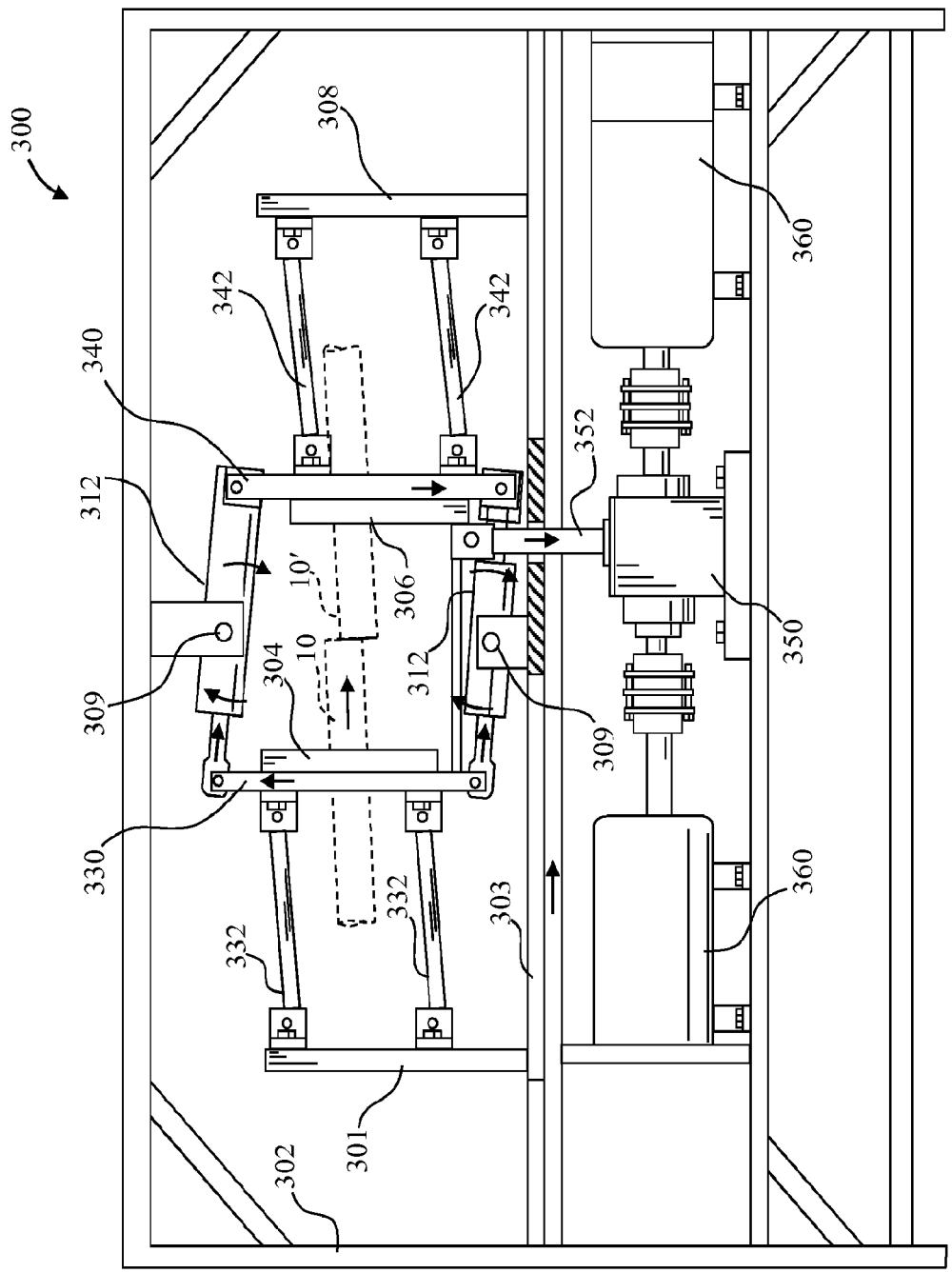
FIGS. 5 and 6 are partial side views of the linear friction welding apparatus of FIG. 4.
Figure 6:
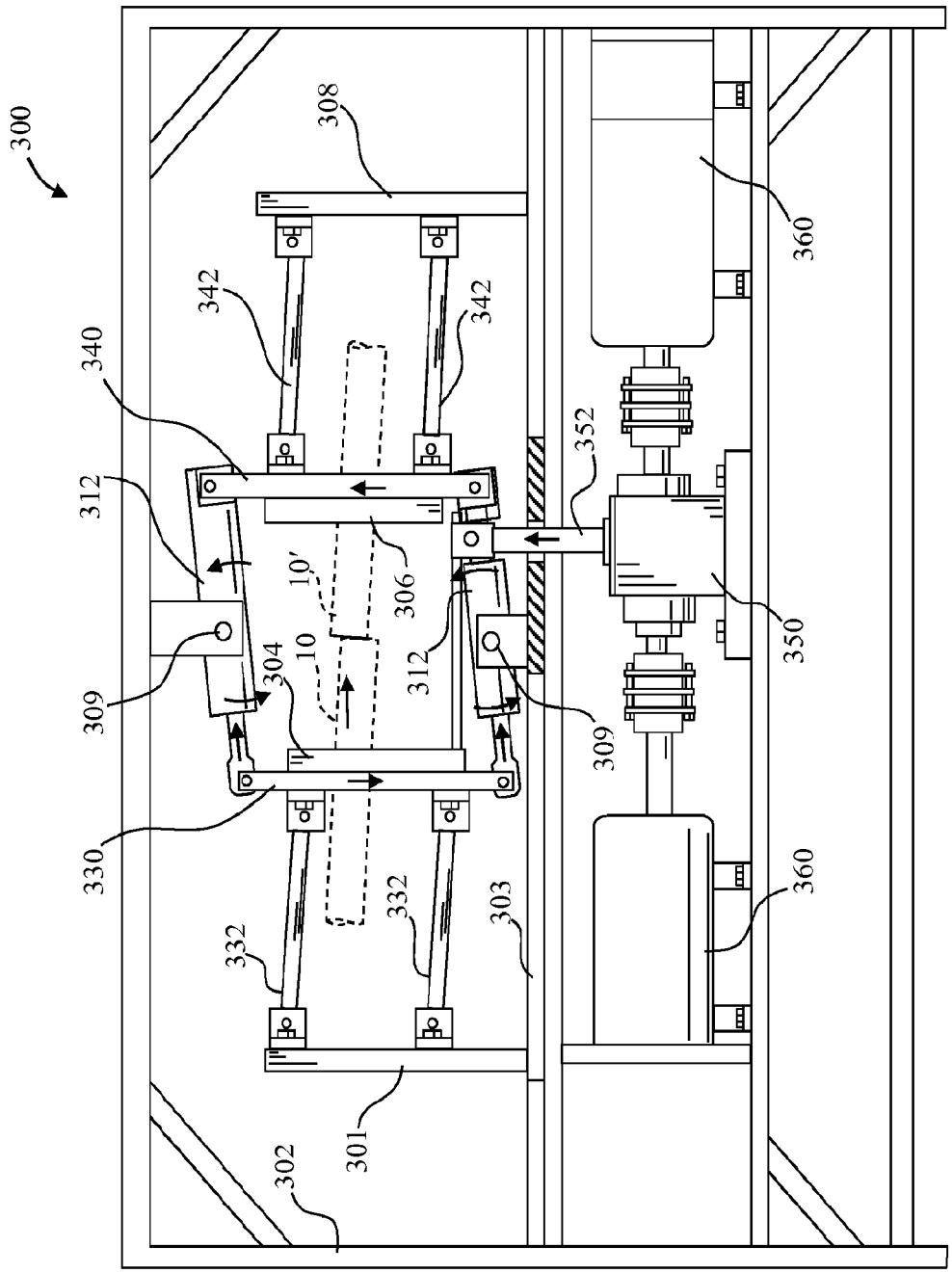

FIGS. 4-6 illustrate a third embodiment of the linear friction welding LFW) apparatus, which is designated as reference number 300. Again, LFW apparatus 300 uses a single oscillator and two sets of rocker arm supported carriages operatively connected by a linkage mechanism to simultaneously vibrate both work pieces 10 and 10' along a single weld axis. The dual sets of rocker arm supported carriages are connected by the linkage mechanism, which generates the relative movement between the work pieces, which provides a mechanical advantage over a single oscillator vibrating assembly.

As shown, LFW apparatus 300 includes a frame 302, which supports press assembly 310 and vibrating assembly 320. Two mounting fixtures 304 and 306 that securely hold work pieces 10 and 10' during the weld process are mounted to carriages 330 and 340, respectively. As with the LFW apparatus 100, mounting fixtures 306 and 308 may take any suitable form or configuration depending on the size, shape and configuration of the work pieces being welded in any particular application.

Vibrating assembly 320 includes a pair of shiftable carriages 330 and 340 shiftably supported by a pair of rocker arms 332 and 342, respectively. Rocker arms 332 pivotally connect carriage 330 to a sliding upright 301, which rides along a frame rail 303. Rocker arms 342 pivotally connect carriage 340 to a stationary upright 308. Carriages 330 and 340 are connected by hydraulic rams 312, which forms part of the press assembly 310. The extensible piston of each rams 312 are pivotally connected to carriage 330 and the casing of rams 312 are pivotally connected to carriage 340. Rams 312 are also pivotally connected to frame 302 at pivot point 309. Vibrating assembly 320 also includes oscillator 350 which is driven by two electric drive motors 360 in accordance with the teachings of the above identified patent. Oscillator 250 reciprocates a ram 352 to vibrate carriages 330 and 340. Again, the linkage mechanism provided by rocker arms 332 and 342, rams 312 and pivot point 309 allows the transfer of the reciprocation of ram 352 of oscillator 350 simultaneously to both carriages 330 and 340 in opposite directions.

One skilled in the art will note that the LWF apparatus of this invention provides certain mechanical advantages. The use of dual oscillators or linkage mechanism in association with a single oscillator allows greater vibration amplitude without increasing the reciprocation distance of the oscillators rams. Consequently, smaller oscillator components may be employed with reduced power demands and without performance decreases.

The embodiments of the present invention herein described and illustrated are not intended to be exhaustive or to limit the invention to the precise form disclosed. They are presented to explain the invention so that others skilled in the art might utilize its teachings. The embodiment of the present invention may be modified within the scope of the following claims.

I claim:

1. A linear friction welding apparatus, comprising:
a first fixture configured to hold a first work piece;
a second fixture configured to hold a second work piece;
a press assembly operatively connected to the first fixture and configured to press the first work piece toward the second work piece along a press axis under selective loads; and
a vibrating assembly spaced apart from the press axis and configured to simultaneously vibrate the first fixture and the second fixture along a weld axis so that both the first work piece and the second work piece are moved along the single weld axis, wherein the vibrating assembly includes:
an oscillator operatively connected to the first fixture for selectively oscillating the first fixture, thereby vibrating the first work piece; and
a linkage connected between the first fixture and second fixture for transferring oscillation of the first fixture to the second fixture thereby vibrating the second work piece.

2. The apparatus of claim 1, wherein:
the linkage is configured such that movement of the first fixture in a first direction causes the second fixture to move in a second direction, the second direction opposite to the first direction.

3. A linear friction welding apparatus, comprising:
a first fixture configured to hold a first work piece;
a second fixture configured to hold a second work piece;
a press assembly operatively connected to the first fixture and configured to press the first work piece toward the second work piece along a press axis under selective loads; and
a vibrating assembly spaced apart from the press axis and configured to simultaneously vibrate the first fixture and the second fixture along a weld axis so that both the first work piece and the second work piece are moved along the single weld axis, wherein:
the vibrating assembly includes an oscillator operatively connected to the first fixture for selectively oscillating the first fixture, thereby vibrating the first work piece; and
the press assembly includes at least one hydraulic ram connected between the first fixture and second fixture and configured to transfer oscillation of the first fixture to the second fixture thereby vibrating the second work piece.

4. The apparatus of claim 3, further comprising:
a first component pivotably supporting the first fixture; and
a second component pivotably supporting the second fixture, wherein the first component is fixedly positioned with respect to the press axis, and the second component is movable with respect to the press axis.

5. A linear friction welding apparatus, comprising:
a first fixture configured to hold a first work piece;
a second fixture configured to hold a second work piece;
a press assembly operatively connected to the first fixture and configured to press the first work piece toward the second work piece along a press axis under selective loads;
a vibrating assembly spaced apart from the press axis and configured to simultaneously vibrate the first fixture and the second fixture along a weld axis so that both the first work piece and the second work piece are moved along the single weld axis;
a first slide extending orthogonally to the press axis and positioned such that the first fixture slides along the first slide as the first fixture is vibrated; and
a second slide extending orthogonally to the press axis and positioned such that the second fixture slides along the second slide as the second fixture is vibrated.

6. The apparatus of claim 5 wherein the vibrating assembly includes a first oscillator mechanism operatively connected to the first fixture for selectively vibrating the first work piece and a second oscillator operatively connected to the second fixture for selectively vibrating the second work piece.

7. The apparatus of claim 5, further comprising:
a third slide extending parallel to the press axis and positioned such that the second slide slides along the third slide as the first work piece is pressed toward the second work piece; and
a fourth slide extending parallel to the press axis and positioned such that the second slide slides along the fourth slide as the first work piece is pressed toward the second work piece.

8. The apparatus of claim 7 wherein the vibrating assembly includes a first oscillator mechanism operatively connected to the first fixture for selectively vibrating the first work piece and a second oscillator operatively connected to the second fixture for selectively vibrating the second work piece.

* * * * *